UNITED STATES PATENT OFFICE.

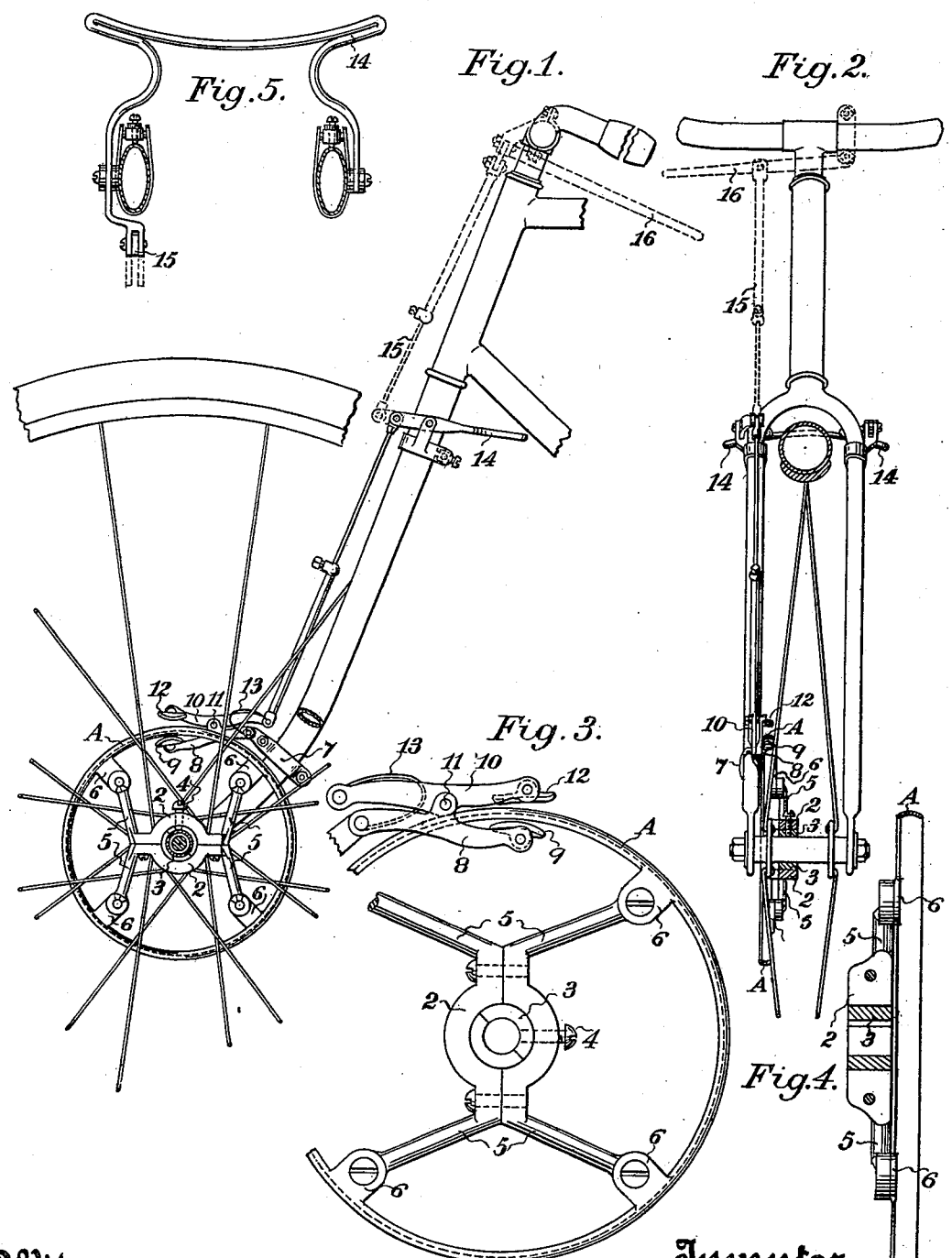

ALBERT HENRY NIELD, OF COUTOLENC, CALIFORNIA, ASSIGNOR OF ONE-HALF TO P. M. REAM, OF LOVELOCK, CALIFORNIA.

BICYCLE-BRAKE.

SPECIFICATION forming part of Letters Patent No. 663,297, dated December 4, 1900.

Application filed June 7, 1900. Serial No. 19,352. (No model.)

*To all whom it may concern:*

Be it known that I, ALBERT HENRY NIELD, a citizen of the United States, residing at Coutolenc, county of Butte, State of California, have invented an Improvement in Bicycle-Brakes; and I hereby declare the following to be a full, clear, and exact description of the same.

My invention relates to a brake for bicycles, automobiles, or other vehicles to which such a structure may be applied.

It consists of an annular rim or flange, with means for fitting and securing it to the axle, so as to support the flange in proper position to be acted upon by the brake-shoes.

It comprises also fulcrumed levers carrying brake-shoes at the ends, which shoes are so fitted as to be clamped against the rim or flange, and mechanism by which power is applied to thus clamp the shoes upon the rim when the brake is to be applied or to release them when it is to be taken off.

My invention also comprises details of construction which will be more fully explained by reference to the accompanying drawings.

Figure 1 is a side view of the brake as applied to a bicycle. Fig. 2 is a front view, partly in section. Fig. 3 is an enlarged side view of the brake the reverse of Fig. 1. Fig. 4 is a vertical section of Fig. 3. Fig. 5 is a plan of the foot-lever.

In the present illustrations I have shown my brake as applied to the front wheel of a bicycle, in which connection it is here described; but it will be manifest that it may be applied to a wheel of either a bicycle or other vehicle by such mechanical changes as are within the province of any one skilled in the art to adapt it to the particular situation in which it is to be employed.

In order to apply the brake as here shown, it is necessary to support the rim or flange A at a point exterior to the spokes of the wheel and interior to the fork side, within which the wheel-axle is secured. In order to effect this, I have shown clamps 2, having a sufficient interior diameter to receive a sleeve or bushing 3, which is made in two halves and has an exterior diameter adapted to fit and be locked within the clamps 2. The interior diameter of the sleeve or bushing will depend upon the size of the hub to which it is to be secured, and it is for this purpose that I employ this independent bushing, so that I may bore it out to any size to fit the hub of the particular vehicle upon which it is to be used. It will be found desirable to carry these bushings in stock, with the interior diameters to fit the known sizes of hubs employed by different makers, and when the bushing has been placed within the clamps 2 it is secured by screwing the clamps together or by set-screw, as at 4. The bushings 2 are provided with arms or spokes 5, which project outwardly and have their outer ends adapted to receive the lugs 6 of the rim or flange A. The arrangement of the spokes 5 and the lug 6 with relation to the clamps and the flange is such that the clamps, with their interior bushing 3, can be fitted upon the hub of the wheel inside of the wheel-spokes, while the offset from the clamps to the rim A is such that the lug when it is secured to the arms or spokes 5 will lie just outside of the wheel-spokes and between them and the fork side, in which the wheel is carried.

I have here shown the rim or flange A made concavo-convex, the interior being made concaved and the exterior convex. Upon the fork side is fixed a clamp 7 of any desired construction or shape, and this is adapted to carry the lever-arm 8, which is fulcrumed to it. Upon this lever-arm is carried one of the brake-shoes 9, which may be of metal, with a leather or other frictional lining adapted to fit one side of the rim A.

10 is the second lever pivoted to the first one, as shown at 11, and carrying the other brake-shoe, 12 with its frictional surface adapted to clamp against the opposite side of the flange A.

13 is a spring of any suitable description fixed to the clamp 7 or other suitable part and connected with the upper lever 10, so that it normally operates to hold the shoe of that lever out of contact with the wheel-flange. The other lever will drop by gravitation, so as to normally retain its shoe out of contact. These levers may be closed so as to cause their shoes to grip the wheel-flange with any desired pressure by means of any well-known lever or connection which is common to bicycles or vehicles generally. In the bicycle the lever may be a foot-lever, as shown at 14, in which case the lever is clamped to the fork sides of the wheel, having one end projecting, so that the foot of the rider may be applied, while the other arm may be connected with the outer end of the clamp-lever 10, so that when pressure is brought upon it the two shoes will be caused to forcibly grip the rim. The plano-concavo form of the rim and the corresponding shape of the gripping-shoes cause the latter to be retained in their proper position with relation to the rim when the brake is applied.

In lieu of the foot-lever for the application of the brake the usual handle-bar lever may be connected to operate the device with the connecting-rod 15, and, if necessary, an intermediate lever 16 to change the direction of motion and properly apply the brake.

By reason of the gripping or clamping shoes and their levers the pressure of each shoe is opposed by that of the other, instead of all the force of the brake being applied to one surface, and for this reason I am enabled to make the rim or flange comparatively light. It may be made of as large diameter as is found necessary to give a proper purchase and brake power commensurate with any grade upon which it is liable to be used and the weight of the machine to be propelled.

Having thus described my invention, what I claim as new, and desire to secure by Letters Patent, is—

1. The combination in a brake of an annular rim, means for supporting it from the wheel-hub, consisting of clamps, means whereby they are caused to grip the hub, arms projecting from said clamps and offset lugs from the wheel-flange whereby the clamps may be fixed to the hub interior to the wheel-spokes and the rim supported exterior thereto.

2. The combination in a brake for bicycle and like wheels of a rim having offset lugs, grips having arms, to the outer ends of which said lugs are secured, a two-part sleeve or bushing adapted to be fitted within the grips and itself bored to fit the hub, and means for clamping it and the grips to the hub.

3. In a brake for bicycle and like wheels, a bushing to fit the hub interior to the wheel-spokes, grips and means whereby they are clamped to the bushing and hub, arms projecting outwardly from the grips, an annular rim having lugs and offset so as to be secured to the arms of the grips and support the rim exterior to the wheel-spokes, levers fulcrumed to a stationary part of the machine, shoes carried by said levers and adapted to press upon the rim in opposition to each other and means by which said levers are actuated to forcibly compress the shoes upon the rim.

4. In a brake for bicycle and like wheels, an annular rim having a concaved interior, and a convex exterior surface, means whereby said rim is supported from the wheel-hub exterior to the line of the wheel-spokes, a clamp fixed upon one of the fork sides of the wheel, a lever-arm fulcrumed to said clamp, carrying a shoe adapted to contact with one side of the annular rim, a second lever fulcrumed upon the first, carrying a shoe adapted to press upon the opposite side of the rim, and a mechanism whereby the said levers are actuated and the shoes compressed against the rim.

5. The combination in a brake for bicycle and like wheels of an annular rim, means for supporting it axially with relation to the wheel, a clamp fixed to a stationary support contiguous to the wheel, levers fulcrumed together, carrying shoes which are adapted to press upon opposite sides of the rim, one of said levers being fulcrumed to the clamp, a lever controlled by the operator of the machine connected with one of the brake-levers whereby the two are actuated in unison, and a spring whereby said levers are moved to release the brake when pressure upon the controlling-lever is removed.

6. In a brake for bicycle and like wheels, a two-part bushing, and a corresponding inclosing sleeve with means for clamping them upon the hub interior to the wheel-spokes, an annular rim located exterior to said wheel-spokes, arms extending from the sleeve outwardly, to which arm the rim is fixed, a pair of fulcrumed levers closable toward each other, having shoes adapted to clamp the rim between them, and mechanism for actuating said levers.

In witness whereof I have hereunto set my hand, at Chico, Butte county, California, this 19th day of May, 1900.

ALBERT HENRY NIELD.

Witnesses:
A. L. NEUBARTH,
P. S. DANIELS.